US012230414B2

(12) United States Patent
Kobayashi

(10) Patent No.: US 12,230,414 B2
(45) Date of Patent: Feb. 18, 2025

(54) VEHICLE CABLE

(71) Applicant: SUMITOMO ELECTRIC INDUSTRIES, LTD., Osaka (JP)

(72) Inventor: Yuto Kobayashi, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/051,680

(22) Filed: Nov. 1, 2022

(65) Prior Publication Data

US 2023/0141502 A1 May 11, 2023

(30) Foreign Application Priority Data

Nov. 9, 2021 (JP) ................................ 2021-182836

(51) Int. Cl.
*H01B 7/08* (2006.01)
*H01B 1/02* (2006.01)
*H01B 11/00* (2006.01)

(52) U.S. Cl.
CPC ............ *H01B 1/023* (2013.01); *H01B 1/026* (2013.01); *H01B 11/002* (2013.01)

(58) Field of Classification Search
CPC .. H01B 7/0807; H01B 7/0823; H01B 7/0861; H01B 11/06
See application file for complete search history.

(56) References Cited

U.S. PATENT DOCUMENTS

| | | | | |
|---|---|---|---|---|
| 6,403,887 | B1 * | 6/2002 | Kebabjian | H01B 11/1025 174/113 R |
| 9,117,572 | B2 * | 8/2015 | Fukasaku | H01B 11/18 |
| 9,214,260 | B2 * | 12/2015 | Ishikawa | H01B 11/1895 |
| 9,349,508 | B2 * | 5/2016 | Nonen | H01B 11/20 |
| 11,569,005 | B2 * | 1/2023 | Moriyama | H01B 7/1895 |
| 11,694,823 | B2 * | 7/2023 | Park | H01B 3/421 174/107 |
| 2010/0025072 | A1 * | 2/2010 | Okano | H01B 11/1008 174/115 |
| 2011/0083877 | A1 * | 4/2011 | Sugiyama | H01B 7/0823 427/117 |
| 2014/0273594 | A1 * | 9/2014 | Jones | H01R 13/113 174/105 R |
| 2017/0330651 | A1 * | 11/2017 | Kunz | H01B 11/1821 |
| 2018/0075948 | A1 * | 3/2018 | Kobayashi | H01B 11/20 |
| 2022/0157494 | A1 * | 5/2022 | Huang | H01B 7/0045 |

FOREIGN PATENT DOCUMENTS

JP 2005-259660 9/2005

* cited by examiner

*Primary Examiner* — Chau N Nguyen
(74) *Attorney, Agent, or Firm* — IPUSA, PLLC

(57) ABSTRACT

A vehicle cable capable of transmitting a signal of 4 GHz or higher includes a two-core cable, a general shield layer that has a braided structure and is disposed on an outer periphery of the two-core cable, and an outer sheath disposed on an outer periphery of the general shield layer. The two-core cable includes two conductors that are a pair of stranded wires arranged in parallel to each other, an insulation layer configured to bundle and cover the two conductors, and a first shield layer including a first metal foil that is disposed on an outer periphery of the insulation layer.

14 Claims, 6 Drawing Sheets

VEHICLE CABLE

CROSS-REFERENCE TO RELATED APPLICATIONS

This application claims priority to Japanese Patent Application No. 2021-182836 filed on Nov. 9, 2021, the entire contents of which are incorporated herein by reference.

BACKGROUND

1. Field of the Invention

The present disclosure relates to vehicle cables.

2. Description of the Related Art

Patent Document 1 describes a Twinax cable that includes a pair of conductors arrayed in parallel; a pair of sheath layers in which each sheath layer is formed by insulating resin, is disposed on a peripheral surface of the corresponding one of the pair of conductors by extrusion molding, and includes a round-pipe-shaped sheath layer body covering the outer peripheral surface of the conductor and a helical protrusion integrally formed on an outer peripheral surface of the sheath layer body; a pair of round-pipe-shaped core outer layers in which each core outer layer is made of an insulating material and is disposed on an outer peripheral surface of a corresponding one of the pair of sheath layers; a drain wire disposed between the pair of core outer layers; and a shielding member configured to shield the pair of core outer layers and the drain wire.

Two-core cables that are also referred to as a Twinax cables are conventionally used for, for example, transmission of signals. For example, as described in Patent Document 1, various studies have been made to improve the performance of such cables.

In recent years, applications of autonomous driving and safety equipment have been investigated and put into use in automobiles, and there has been a demand for vehicle cables that can transmit high-frequency band signals in automobiles.

Therefore, an object of the present disclosure is to provide a vehicle cable capable of transmitting high-frequency band signals.

RELATED ART DOCUMENT

Patent Document

[Patent Document 1] Japanese Laid-open Patent Application Publication No. 2005-259660

SUMMARY

A vehicle cable of the present disclosure is a vehicle cable capable of transmitting a signal of 4 GHz or higher including a two-core cable, a general shield layer that has a braided structure and is disposed on an outer periphery of the two-core cable, and an outer sheath disposed on an outer periphery of the general shield layer. The two-core cable includes two conductors that are a pair of stranded wires arranged in parallel to each other, an insulation layer configured to bundle and cover the two conductors, and a first shield layer including a first metal foil that is disposed on an outer periphery of the insulation layer.

According to the present disclosure, a vehicle cable capable of transmitting a high-frequency band signal can be provided.

DETAILED DESCRIPTION

Figure 1:
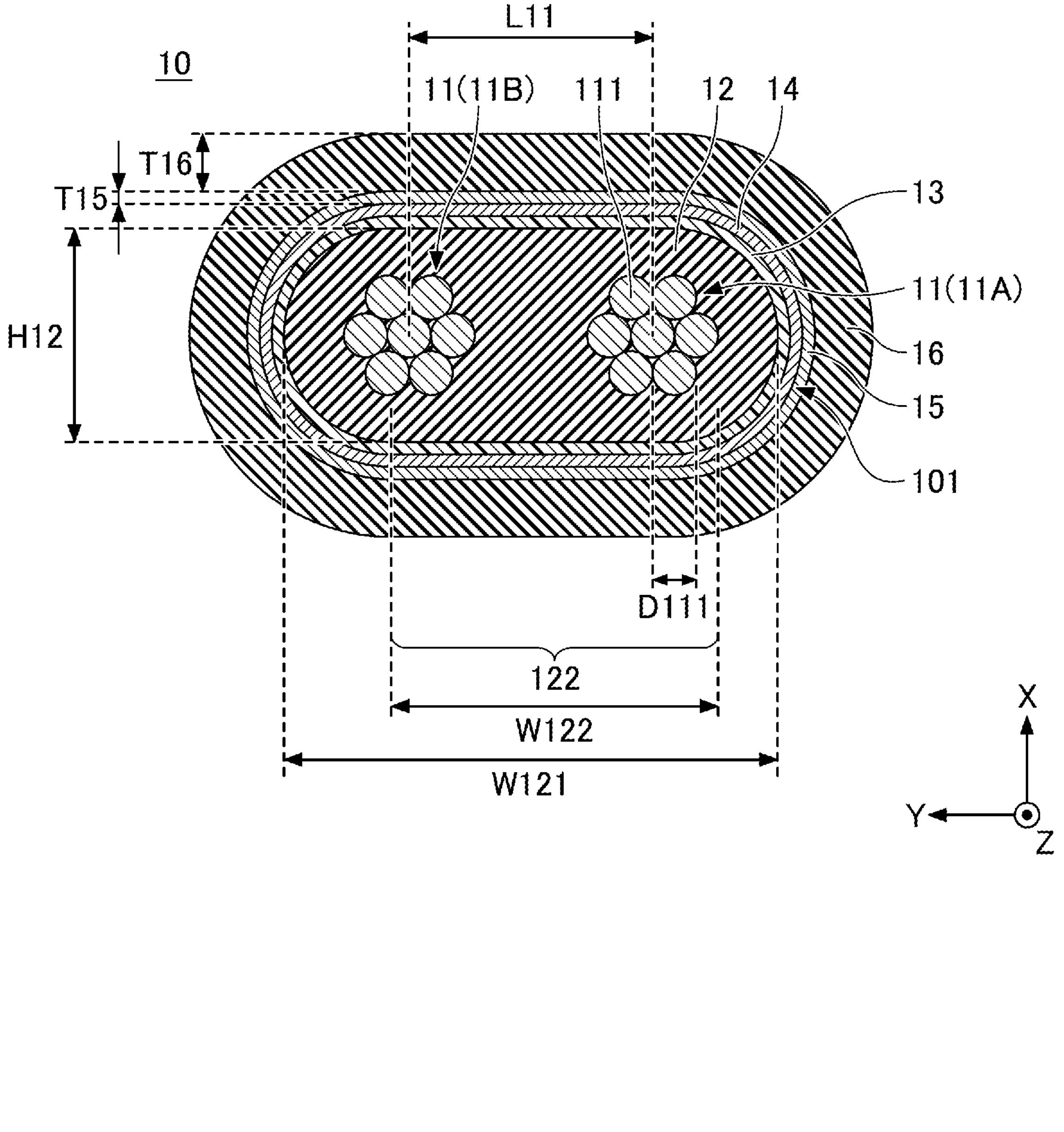
FIG. 1 is a cross-sectional view taken along a plane perpendicular to a longitudinal direction of a vehicle cable according to an embodiment of the present disclosure.

Embodiments will be described below.

DESCRIPTION OF EMBODIMENTS OF PRESENT DISCLOSURE

Embodiments of the present disclosure will be listed and described. In the following description, the same reference symbols denote the same or corresponding elements, and a description thereof will be omitted.

(1) A vehicle cable according to an embodiment of the present disclosure is a vehicle cable capable of transmitting a signal of 4 GHz or higher. The vehicle cable according to the embodiment includes a two-core cable, a general shield layer that has a braided structure and is disposed on an outer periphery of the two-core cable, and an outer sheath disposed on an outer periphery of the general shield layer. The two-core cable includes two conductors that are a pair of stranded wires arranged in parallel to each other, an insulation layer configured to bundle and cover the two conductors, and a first shield layer including a first metal foil that is disposed on an outer periphery of the insulation layer.

Using a stranded wire as a conductor increases the flexibility, in which the vehicle cable can be easily bent, and the bendability, in which the vehicle cable is not easily broken when bent repeatedly, compared to a case where the conductor is a solid wire instead of a stranded wire.

Also, in the vehicle cable according to the embodiment, since the two conductors are bundled and covered, the material environment between the two conductors can be made uniform easily. Hence, it is possible to sufficiently suppress the insertion loss in high-frequency band signals of 4 GHz or higher, and thus implement a vehicle cable capable of transmitting a high-frequency band signal of 4 GHz or higher.

(2) The first metal foil included in the first shield layer may be in contact with the general shield layer.

Since the first metal foil included in the first shield layer is in contact with the general shield layer, the first shield layer can be easily coupled to an external terminal through, for example, the general shield layer.

(3) A plurality of two-core cables may be included. The plurality of two-core cables may be twisted, and a second shield layer including a second metal foil may be disposed on the outer periphery of the twisted plurality of two-core cables. The general shield layer and the outer sheath may be disposed so as to cover the outer periphery of the second shield layer.

Including the plurality of two-core cables can increase the variety of devices that can be supported.

Furthermore, by disposing the second shield layer on the outer periphery of the two-core cables, an electrical coupling can be formed between the first shield layer and the general shield layer.

(4) The second shield layer includes a double-sided metal tape that is wound helically along the longitudinal direction of the plurality of two-core cables and includes the second metal foil on an upper surface and a lower surface of a substrate. The second metal foil disposed on the upper surface of the substrate may be in contact with the general shield layer.

By helically winding the double-sided metal tape, which includes the metal foil on the upper and lower surface of the substrate, along the longitudinal direction of the plurality of two-core cables, the metal foils disposed on the upper and lower surfaces of the substrate come into contact with each other at an overlapping portion, thus allowing the two members to be electrically coupled. The metal foil disposed on the upper surface of the substrate contacting the general shield layer can form an electrical coupling between the first shield layer of the two-core cable and the general shield layer through the second shield layer. Electrically coupling the first shield layer, the second shield layer and the general shield layer to each other allows the first shield layer and the second shield layer to be easily coupled to an external terminal through the general shield layer. Furthermore, the first shield layer, the second shield layer and the general shield layer can suppress the leakage of signals to the outside of the cable and the introduction of electromagnetic waves from the outside of the cable.

(5) The second metal foil may be made of copper or aluminum.

By using copper or aluminum to form the second metal foil included by the second shield layer, the metal foil can have a uniform and sufficient conductivity. This can suppress the leakage of signals to the outside of the cable and the introduction of electromagnetic waves from the outside of the cable.

(6) The insulation layer may contain one or more types of insulating resins selected from polypropylene and cross-linked polyethylene.

Since polypropylene and cross-linked polyethylene have excellent heat resistance, containing one or more types of insulating resins selected from polypropylene and cross-linked polyethylene increases heat resistance of the insulation layer and the vehicle cable that includes the insulation layer.

(7) The first metal foil may be made of copper or aluminum.

By using copper or aluminum to form the first metal foil included in the first shield, the metal foil can have a uniform and sufficient conductivity. This can suppress the leakage of signals to the outside of the cable and the introduction of electromagnetic waves from the outside of the cable.

(8) The two-core cable includes an insulating tape layer between the insulation layer and the first shield layer. The insulating tape layer may include an insulating tape that is wound helically along the longitudinal direction of the insulation layer and includes an insulating substrate layer containing polyethylene terephthalate.

Polyethylene terephthalate has a higher permittivity than polypropylene, polyethylene, or the like. Hence, when the characteristic impedance of the vehicle cable is to be set to a desired value, providing the insulating tape layer containing polyethylene terephthalate can reduce the size of the insulation layer more than in a case where the insulating tape layer is not provided. Therefore, the size of the vehicle cable can be reduced, and thus the handling of the vehicle cable can be improved.

(9) The thickness of the outer sheath may be 0.3 mm or more to 1.0 mm or less.

Setting the thickness of the outer sheath to 0.3 mm or more to 1.0 mm or less can improve the abrasion resistance, the flame retardancy, and the flexibility of the vehicle cable.

(10) The thickness of the outer sheath may be 0.4 mm or more to 0.8 mm or less.

Setting the thickness of the outer sheath to 0.4 mm or more to 0.8 mm or less can improve the abrasion resistance, the flame retardancy, and the flexibility of the vehicle cable.

Details of Embodiments of Present Disclosure

Specific examples of the vehicle cable according to each embodiment (to be referred to as "the embodiment" hereinafter) of the present disclosure will be described below with reference to the accompanying drawings. Note that the present invention is not limited to these examples. The present invention is intended to be indicated by the appended claims and to include all changes and modifications within the scope of the appended claims and within the meaning and scope of the equivalents of the appended claims.

Vehicle Cable

(1) First Embodiment

FIG. 1 illustrates a cross-sectional view taken along a plane perpendicular to the longitudinal direction of a vehicle cable 10 according to the embodiment. In FIG. 1, the X-axis direction indicates the height direction of the vehicle cable 10, the Y-axis direction indicates the width direction of the vehicle cable 10, and the Z-axis direction perpendicular to the page indicates the longitudinal direction of the vehicle cable 10.

The inventor of the present invention has investigated a vehicle cable capable of transmitting a signal of 4 GHz or higher, that is, a vehicle cable in which insertion loss with respect to a high-frequency band signal of 4 GHz or higher is suppressed. The inventor has found that a two-core cable including an insulation layer that bundles and covers two conductors for signal transmission can be used to implement a vehicle cable in which insertion loss with respect to a high-frequency band signal of 4 GHz or higher is suppressed. The inventor has completed the invention based on this finding.

Therefore, the vehicle cable according to the embodiment relates to a vehicle cable capable of transmitting a signal of 4 GHz or higher.

The components included by the vehicle cable according to the embodiment will be described hereinafter.

(1-1) Two-Core Cable

As illustrated in FIG. 1, the vehicle cable 10 according to the embodiment includes a two-core cable 101 including two conductors 11 that are a pair of stranded wires arranged in parallel to each other, an insulation layer 12 bundling and covering the two conductors 11, and a first shield layer 14 including a first metal foil disposed on the outer periphery of the insulation layer 12. The components included in the two-core cable 101 will be described below.

(1-1-1) Conductors

The vehicle cable according to the embodiment can include two conductors that are a pair of stranded wires arranged in parallel to each other.

In the interest of enhancing the workability when wiring is performed to attach the vehicle cable to a vehicle, the vehicle cable is required to have flexibility that allows it to be bent easily in accordance with the shape of the attachment position. Also, the vehicle cable may bend repeatedly due to a force being applied in accordance with the movement of a connected component. Thus, the vehicle cable is required to have bendability that curtails breaking when it is bent repeatedly.

Hence, as illustrated in FIG. 1, the vehicle cable 10 according to the embodiment can use a stranded wire as each conductor 11 for signal transmission. Using a stranded wire as the conductor 11 increases the flexibility, in which the vehicle cable can be easily bent, and the bendability, in which the vehicle cable is not easily broken when bent repeatedly, compared to a case where the conductor 11 is a solid wire instead of a stranded wire.

A wire diameter D111 of each wire 111 and the number of the wires 111 forming the stranded wire of each conductor 11 are not particularly limited, and can be selected based on the type of signals to be transmitted by the vehicle cable 10 or the degree of the flexibility or the like required for the vehicle cable 10.

(Wire Diameter D111)

The wire diameter D111 of each wire forming the stranded wire serving as each conductor 11 is preferably, for example, 0.100 mm or more to 0.500 mm or less. More preferably, the wire diameter D111 may be 0.110 mm or more to 0.220 mm or less. By setting the wire diameter D111 to 0.100 mm or more, the productivity of the stranded wire serving as the conductor 11 can be enhanced while reducing the number of wires used to form the stranded wire serving as the conductor 11. In addition, setting the wire diameter D111 of each wire forming the stranded wire serving as the conductor 11 to 0.500 mm or less can increase the flexibility and the bendability of each conductor 11 and the flexibility and the bendability of the vehicle cable 10 including the conductors 11.

The wire diameter of each wire can be measured and calculated based on the following procedure.

First, in any cross section perpendicular to the longitudinal direction of a wire, the wire diameter of the wire is measured by a micrometer along the two orthogonal diameters of the wire that is being evaluated. An average of the values measured at the aforementioned two locations can be set as the wire diameter of the wire. In this specification, the wire diameter of each wire can be measured and calculated in the same manner.

(Number of Wires)

The number of wires forming the stranded wire serving as the conductor 11 is not particularly limited. For example, the number of wires is preferably 7 or more to 37 or less, and is more preferably 7 or more to 19 or less. Setting the number of wires that form the stranded wire serving as the conductor 11 to 7 can increase the flexibility and the bendability of each conductor 11 as well as the flexibility and the bendability of the vehicle cable 10 including the conductors 11. Furthermore, setting the number of wires foaming the stranded wire serving as the conductor 11 to 37 or less can enhance the productivity of the stranded wire serving as the conductor 11. The number of wires forming the stranded wire serving as the conductor 11 represents the number of wires included in each conductor 11, that is, the number of wires included in each of a conductor 11A and a conductor 11B.

Each of the conductor 11A and the conductor 11B can include, for example, the above-described number of wires that have the above-described wire diameter D111, and can be formed by helically twisting the wires along the longitudinal direction. It is preferable for the conductor 11A and the conductor 11B to be formed by the same wires and the same number of wires. A stranded wire formed by twisting seven strands of wire with a wire diameter of 0.2 mm can be a specific configurational example of each of the conductor 11A and the conductor 11B.

(Distance L11)

A distance L11 between the conductor 11A and the conductor 11B is not particularly limited. However, it is preferable for the distance L11 to be 0.5 mm or more to 3.0 mm or less, and more preferably be 0.8 mm or more to 2.0 mm or less. Setting the distance L11 between the conductor 11A and the conductor 11B to 0.5 mm or more can ensure a sufficient distance between the conductor 11A and the conductor 11B and can reliably prevent electrical contact between the conductors 11A and 11B, that is, reliably prevent the generation of short circuits. Also, setting the distance L11 between the conductor 11A and the conductor 11B to 3.0 mm or less can restrain the size of the vehicle cable 10 while increasing the flexibility of the vehicle cable 10.

The distance L11 between the conductor 11A and the conductor 11B represents the distance between the center of the conductor 11A and the center of the conductor 11B in a cross section perpendicular to the longitudinal direction of the vehicle cable 10. The center of the conductor 11A and the center of the conductor 11B each represents the center of a circumscribed circle of the conductor in a cross section perpendicular to the longitudinal direction of the vehicle cable 10.

The distance L11 between the conductors can be, for example, a value measured on any cross section perpendicular to the longitudinal direction of the vehicle cable 10. However, since the distance L11 between the conductors may include a certain amount of variation, it is preferable for the distance L11 to be the average of values measured on multiple cross sections perpendicular to the longitudinal direction of the vehicle cable 10. For example, it is preferable for the distance L11 between the conductors to be the average of the values obtained by measuring the distance between the conductors on 3 or more to 10 or less cross sections, which are perpendicular to the longitudinal direction of the vehicle cable 10. Particularly, in the interest of efficiency, it is preferable for the distance L11 of the conductors to be the average of the values obtained by measuring the distance between the conductors on three cross sections. When the distance L11 between the conductors is to be measured on multiple cross sections perpendicular to the longitudinal direction of the vehicle cable 10, the distance between two adjacent measurement surfaces in the longitudinal direction of the vehicle cable 10 is preferably 10 mm or more to 50 mm or less. For example, the distance between two adjacent measurement surfaces in the longitudinal direction of the vehicle cable 10 can be 20 mm.

A specific configurational example of the distance L11 between the conductor 11A and the conductor 11B is 1.8 mm.

The conductors 11A and 11B can be arranged in parallel to each other in the above-described manner. It is preferable for the distance L11 between the conductor 11A and the conductor 11B to be constant. However, even in such a case, the distance L11 between the conductor 11A and the conductor 11B can be within a range that can be considered constant, including manufacturing tolerances.

(Material of Conductors)

The material of each conductor 11 is not particularly limited, but one or more conductive materials selected from, for example, annealed copper, silver, nickel-plated annealed copper, tin-plated annealed copper, and the like can be used.

(1-1-2) Insulation Layer

The vehicle cable 10 according to the embodiment can use the insulation layer 12 that bundles and covers the two conductors 11.

Conventionally, in the two-core cable referred to as the Twinax cable, each conductor is covered with an insulation layer, and the two coated wires are subsequently covered by a shield layer or an outer sheath. However, covering each conductor with an insulation layer may generate variation in the thickness of the insulation layers due to manufacturing or may cause the shield layer to fall in a recessed portion between the two coated wires, and thus it is difficult to maintain a uniform environment for, for example, the materials between the two conductors. Hence, it is difficult to implement a cable that is capable of transmitting a high-frequency band signal of, for example, 4 GHz or higher while suppressing insertion loss in a high-frequency band signal of 4 GHz or higher.

In contrast, since the two conductors 11 are bundled and covered in the vehicle cable according to the embodiment, the the environment for the material between the two conductors 11 can be made uniform easily. Hence, it is possible to implement a cable that is capable of transmitting a high-frequency band signal of 4 GHz or higher while suppressing insertion loss in the high-frequency band signal of 4 GHz or higher.

Note that the vehicle cable 10 according to the embodiment suffices to be capable of transmitting a high-frequency band signal of 4 GHz or higher. Although there is no particular upper limit to the frequency band of the signal to be transmitted, it is preferable for the vehicle cable 10 to be capable of transmitting a signal in a high-frequency band that ranges from, for example, 4 GHz or higher to 30 GHz or lower.

(Size of Insulation Layer)

The size of the insulation layer 12 is not particularly limited. However, it is preferable for a width W121 corresponding to the length of the long axis of the insulation layer 12, in a cross section perpendicular to the longitudinal direction of the vehicle cable 10, to be 1.5 mm or more to 9.0 mm or less and more preferably to be 1.5 mm or more to 4.0 mm or less.

By setting the width W121 to 1.5 mm or more, the surfaces of the conductors 11 can be covered with the insulation layer 12 of a sufficient thickness to protect the conductors 11 while ensuring a sufficient distance between the conductors 11. Also, by setting the width W121 to 9.0 mm or less, it is possible to restrain the size of the vehicle cable 10 and improve the handling of the vehicle cable 10.

In addition, the height H12 corresponding to the length of the short axis of the insulation layer 12 is preferably 0.75 mm or more to 4.5 mm or less, and is more preferably 0.8 mm or more to 3.5 mm or less.

By setting the height H12 of the insulation layer 12 to 0.75 mm or more, the surfaces of the conductors 11 can be covered with the insulation layer 12 of a sufficient thickness to protect the conductors 11. Also, by setting the height H12 of the insulation layer 12 to 4.5 mm or less, it is possible to restrain the size of the vehicle cable 10 and to particularly increase the flexibility of the vehicle cable 10.

The insulation layer 12 can also include a flat part 122 along the width direction, that is, the Y-axis direction in a cross section perpendicular to the longitudinal direction of the vehicle cable 10. Although a width W122 of the flat part 122 is not particularly limited, it is preferable for the width W122 to be, for example, 0.5 mm or more to 3.0 mm or less and more preferably to be 0.8 mm or more to 2.5 mm or less.

The vehicle cable 10 can be easily bent along, for example, the X-axis direction. However, by setting the width W122 of the flat part 122 to be 0.5 mm or more, the vehicle cable 10 can particularly be bent more easily. That is, the flexibility of the vehicle cable 10 can be increased.

In addition, by setting the width W122 of the flat part 122 to be 3.0 mm or less, it is possible to restrain the size of the vehicle cable 10, and thus improve the handling of the vehicle cable 10.

The length of each part of the insulation layer 12 is not particularly limited, and the length of each part can be selected in the above described manner from, for example, the above-described ranges. For example, as representative values, the width W121 can be 3.7 mm, the height H12 can be 1.8 mm, and the width W122 of the flat part 122 can be 1.8 mm.

The respective dimensions of the parts of the insulation layer 12, that is, the width W121, the width W122 of the flat part, and the height H12 can be values obtained by measuring, for example, any cross section perpendicular to the longitudinal direction of the vehicle cable 10. However, since the length of each part of the insulation layer 12 of the vehicle cable 10 may include a certain amount of variation, it is preferable for the length of each part to be the average of values measured on multiple cross sections perpendicular to the longitudinal direction of the vehicle cable 10. For example, it is preferable for each of the width W121, the width W122 of the flat part, and the height H12 described above to be the average of the values obtained by measuring the length of the part on 3 or more to 10 or less cross sections, which are perpendicular to the longitudinal direction of the vehicle cable 10. Particularly, in the interest of efficiency, it is preferable for the length of each part to be the average of the values obtained by measuring the length of each part on three cross sections. When the length of each part is to be measured on multiple cross sections perpendicular to the longitudinal direction of the vehicle cable 10, the distance between two adjacent measurement surfaces in the longitudinal direction of the vehicle cable 10 is preferably 10 mm or more to 50 mm or less. For example, the distance between two adjacent measurement surfaces in the longitudinal direction of the vehicle cable 10 can be 20 mm.

(Material of Insulation Layer)

The material of the insulation layer 12 is not particularly limited, and can be selected in accordance with the properties required for the vehicle cable 10.

The insulation layer 12 can contain, for example, an insulating resin. The insulating resin is not particularly limited, but is preferable to be one or more types of insulating resins selected from, for example, polypropylene and cross-linked polyethylene. That is, the insulation layer 12 preferably contains one or more types of insulating resins selected from polypropylene and cross-linked polyethylene.

Since polypropylene and cross-linked polyethylene have excellent heat resistance, containing one or more types of insulating resins selected from polypropylene and cross-linked polyethylene in the insulation layer 12 increases heat resistance of the insulation layer 12 and the vehicle cable 10 that includes the insulation layer 12.

Note that since it is typically difficult for polypropylene to be cross-linked, a non-crosslinked polypropylene, which has not been cross-linked, can be suitably used.

The insulation layer 12 can also contain various types of additives other than the insulating resin described above. The insulation layer 12 can contain, as an additive, one or more types of additives selected from, for example, a flame retardant, an antioxidant, a cross-linking agent, a cross-linking coagent, a lubricant, and the like.

The flame retardant, the antioxidant, cross-linking agent, and the like are not particularly limited, and known materials can be used as the flame retardant, the antioxidant, cross-linking agent, and the like.

For example, halogenated flame retardants and non-halogenated flame retardants can be used as the flame retardants. Brominated flame retardants or the like can be used as the halogenated flame retardants. Metal hydroxides such as magnesium hydroxide, nitrogen-based flame retardants, antimony trioxide, and phosphate-based flame retardants such as red phosphorus and organophosphates can be used as the non-halogenated flame retardants.

Although the formation method of the insulation layer 12 is not particularly limited, the material contained in the insulation layer can be formed on the outer periphery of the conductors 11 by full extrusion molding.

Although a drain wire or the like can be provided other than the above-described conductors 11 in the insulation layer 12, it is preferable not to include a drain wire or the like in the insulation layer 12 of the vehicle cable according to the embodiment. Since a drain wire is electrically coupled to a shield layer or the like, it is usually used without coating. Hence, if a drain wire is disposed in the insulation layer 12, the drain wire may come into contact with the conductors 11 and cause a short circuit. In contrast, by not disposing a drain wire in the insulation layer 12, it is possible to prevent electrical coupling between the conductors 11 and the drain wire, that is, it is possible to prevent the generation of a short circuit.

In particular, in the vehicle cable 10 according to the embodiment, it is preferable for the conductors 11 to be the only electric wires present in the insulation layer 12.

(1-1-3) First Shield Layer

The vehicle cable 10 can include the first shield layer 14 including a first metal foil disposed on the outer periphery of the insulation layer 12.

By including the first shield layer 14 in the vehicle cable 10, it is possible to prevent the leakage of signals to the outside of the cable and to prevent the introduction of electromagnetic waves from the outside of the cable. That is, a shielding effect can be exerted.

Further, it is preferable for the first metal foil included in the first shield layer to be in contact with a general shield layer 15 (to be described later). The first metal foil included in the first shield layer 14 being in contact with the general shield layer 15 allows the first shield layer 14 to be easily coupled to an external terminal or the like via, for example, the general shield layer 15.

Although the configuration of the first shield layer 14 is not particularly limited, it can include, for example, a metal tape including metal foil helically wound on the outer periphery of the insulation layer 12 or an insulating tape layer 13 (to be described later) along the longitudinal direction of the insulation layer 12. The first shield layer 14 can be formed by this aforementioned metal tape. In such a case, the metal foil included by the metal tape is the first metal foil.

As described above, in a case where the first shield layer 14 includes the metal tape, the configuration of the metal tape is not particularly limited. However, it is preferable for the metal tape to include the metal foil on, for example, at least one of the surfaces of its substrate.

Figure 4A:
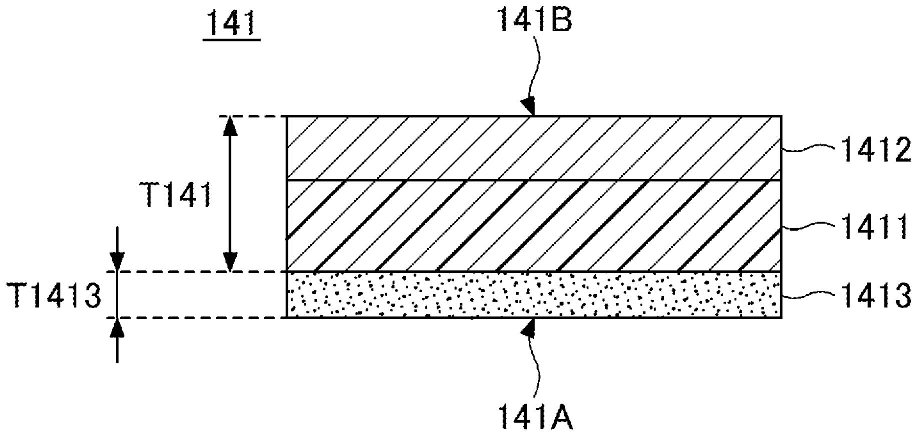
FIG. 4A is a cross-sectional view taken along a plane perpendicular to the longitudinal direction of a metal tape that can be applied to a first shield layer.

The metal tape used to form the first shield layer 14 can have, for example, the configuration of a metal tape 141 whose cross section perpendicular to the longitudinal direction is illustrated in FIG. 4A.

The metal tape 141 illustrated in FIG. 4A has a structure in which a substrate 1411 and a metal foil 1412 are stacked. Hence, the first shield layer 14 including the first metal foil can be formed by helically winding the metal tape 141 on the outer periphery of the insulation layer 12 or the like along the longitudinal direction of the insulation layer 12. Note that to form the first shield layer 14 on the entire outer periphery of the insulation layer 12, it is preferable to wind the metal tape 141 on the outer periphery of the insulation layer 12 so that the parts of the metal tape 141 overlap each other.

The metal tape 141 can also include an adhesive layer 1413 on a surface of the substrate 1411 on which the metal foil 1412 is not disposed. Including the adhesive layer 1413 in the metal tape 141 allows the parts of the metal tape 141 to be adhered together, via the adhesive layer 1413, at the overlapping parts of the metal tape 141 when the metal tape 141 is helically wound on the outer periphery of the insulation layer 12 or the like in the longitudinal direction of the insulation layer 12. Hence, the shape of the first shield layer 14 can be stabilized.

In a case where the first shield layer 14 is to be famed by the metal tape 141, it is preferable to wind the metal tape 141 on the outer periphery of the insulation layer 12 by positioning a surface 141B, which is on the side of the metal foil 1412, on the side of the general shield layer 15 so that the metal foil 1412 can contact and be electrically coupled to the general shield layer 15 or the like. In this case, a surface 141A, which is on the side of the substrate 1411, is positioned on the side of the insulation layer 12.

The metal tape used to form the first shield layer 14 is not limited to the metal tape 141. The metal tape used to foam the first shield layer 14 may be a double-sided metal tape that includes a metal foil on both sides, that is, the upper and lower surfaces, of a substrate as in a double-sided metal tape 142 illustrated in FIG. 4B. The double-sided metal tape 142 includes an upper metal foil 1422 on the upper surface of a substrate 1421 and a lower metal foil 1423 on the lower surface of the substrate 1421.

Figure 4B:
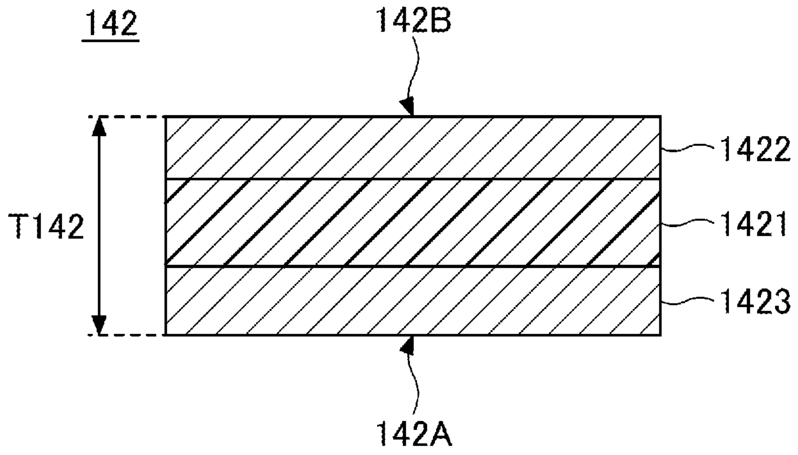
FIG. 4B is a cross-sectional view taken along a plane perpendicular to the longitudinal direction of a metal tape that can be applied to the first shield layer and a second shield layer.

Even in a case of the double-sided metal tape 142 illustrated in FIG. 4B, an adhesive layer can be provided on either a surface 142A of the lower metal foil 1423 or a surface 142B of the upper metal foil 1422. Alternatively, an adhesive layer may be provided on both of the surfaces 142A and 142B.

The size of the metal tape used to form the first shield layer 14 is not particularly limited. For example, if the metal tape 141 illustrated in FIG. 4A is used, it is preferable the total of the thicknesses of the metal foil and the substrate, that is, a thickness T141 in FIG. 4A is preferably, for example, 5 μm or more to 30 μm or less and is more preferably 10 μm or more to 30 μm or less. By setting the total of the thicknesses of the metal foil and the substrate in the metal tape 141 illustrated in FIG. 4A to 5 μm or more, the metal foil can be ensured to have a sufficient thickness, and thus enhance a shielding effect. Also, by setting the total of the thicknesses of the metal foil and the substrate to 30 μm or less, it becomes easier to make the metal tape follow the outer shape of the insulation layer 12 or the like when the metal tape is wound on the outer periphery of the insulation layer 12 or the like. Hence, the shape of the first shield layer 14 can be made uniform regardless of its position on the longitudinal direction of the vehicle cable, and the signal transmission performance of the vehicle cable can be stabilized.

If the double-sided metal tape 142 illustrated in FIG. 4B is used to foam the first shield layer 14, it is preferable the total of the thicknesses of the metal foil and the substrate, that is, a thickness T142 is preferably, for example, 10 μm or more to 100 μm or less and is more preferably 15 μm or more to 80 μm or less. By setting the total of the thicknesses of the metal foil and the substrate to 10 μm or more, each metal foil can be ensured to have a sufficient thickness, and thus enhance the shielding effect. Also, by setting the total of the thicknesses of the metal foil and the substrate to 100 μm or less, it becomes easier to make the metal tape follow the outer shape of the insulation layer 12 or the like when the metal tape is wound on the outer periphery of the insulation layer 12 or the like. Hence, the shape of the first shield layer 14 can be made uniform regardless of its position on the longitudinal direction of the vehicle cable, and the signal transmission performance of the vehicle cable can be stabilized.

The thicknesses T141 and T142 are not particularly limited, and can be selected in the above describe manner from, for example, the above-described ranges. For example, as representative values, the thickness T141 can be 15 μm, and the thickness T142 can be 20 μm.

A thickness T1413 of the adhesive layer 1413 is also not particularly limited. However, it is preferable for the thickness T1413 to be, for example, 0.1 μm or more to 10 μm or less, and more preferably to be 0.1 μm or more to 5 μm or less. By setting the thickness T1413 of the adhesive layer 1413 to 0.1 μm or more, a sufficient amount of adhesive can be contained, and the shape of the first shield layer 14 can be particularly stabilized. Since there is no difference in the stabilizing effect even if the adhesive layer 1413 is made excessively thick, it is preferable for the thickness T1413 to be 10 μm or less as described above in terms of cost. The thickness T1413 of the adhesive layer 1413 is not particularly limited, and can be selected in the above described manner from, for example, the above-described ranges. For example, as a representative value, the thickness T1413 can be 2 μm.

In the interest of the shielding effect, the material of the first metal foil included in the first shield layer 14 suffices to be a conductive material and is not particularly limited. However, it is preferable for the material of the first metal foil to be, for example, copper or aluminum. By using copper or aluminum as the first metal foil included in the first shield layer 14, the metal foil can be ensured to have a uniform and sufficient conductivity. This can particularly suppress the leakage of signals to the outside of the cable and the introduction of electromagnetic waves from the outside of the cable.

Note that the material of the substrate 1411 of the metal tape 141 or the material of the substrate 1421 of the double-sided metal tape 142 is not particularly limited. However, for example, it is possible to use polyethylene terephthalate (PET) as the material of each substrate.

(1-1-4) Insulating Tape Layer

The two-core cable 101 can also include the insulating tape layer 13 between the insulation layer 12 and the first shield layer 14 described above.

Figure 3:
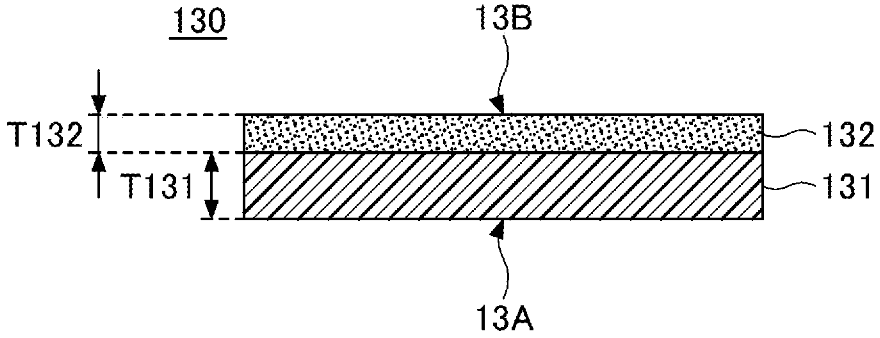
FIG. 3 is a cross-sectional view taken along a plane perpendicular to the longitudinal direction of an insulating tape that can be applied to an insulating tape layer.

The insulating tape layer 13 can include an insulating tape 130, which is illustrated in FIG. 3, that is helically wound on the outer periphery of the insulation layer 12 along the longitudinal direction of the insulation layer 12. Note that the insulating tape layer 13 can also be formed by the insulating tape 130.

FIG. 3 illustrates a cross section of the insulating tape 130 in the thickness direction. The insulating tape 130 can include an insulating substrate layer 131 containing polyethylene terephthalate (PET). The insulating substrate layer 131 can also be made of polyethylene terephthalate.

The permittivity of polyethylene terephthalate is higher than those of polypropylene, polyethylene, and the like. Hence, when the characteristic impedance of the vehicle cable 10 is to be set to a desired value, providing the insulating tape layer 13 containing polyethylene terephthalate can reduce the size of the insulation layer 12 more than in a case where the insulating tape layer 13 is not provided. Therefore, the size of the vehicle cable 10 can be reduced, and thus the handling of the vehicle cable 10 can be improved.

The insulating tape 130 can also include an adhesive layer 132 on either the upper surface or the lower surface of the insulating substrate layer 131. Providing the adhesive layer 132 allows the parts of the insulating tape 130 to be adhered together, via the adhesive layer 132, at the overlapping portions of the insulating tape 130 when the insulating tape 130 is helically wound on the outer periphery of the insulation layer 12 along the longitudinal direction of the insulation layer 12. Hence, the shape of the insulating tape layer 13 can be stabilized.

Note that when winding the insulating tape 130 including the adhesive layer 132 on the outer periphery of the insulation layer 12, it is preferable to wind the insulating tape 130 so that a surface 13B on which the adhesive layer 132 is disposed is positioned on the side of the aforementioned first shield layer 14. That is, in this case, it is preferable to arrange the insulating tape 130 so that a surface 13A on which the adhesive layer 132 is not disposed is positioned on the side of the insulation layer 12.

By arranging the surface 13A on which the adhesive layer 132 is not disposed on the side of the insulation layer 12, it is possible to prevent the insulation layer 12 from being adhered to the insulating tape layer 13 by the adhesive layer 132. As a result, the process of removing an outer sheath 16 or the like and taking out the conductors 11 at the end of the vehicle cable 10 in the longitudinal direction can be performed more easily when the vehicle cable 10 is to be coupled to a device or the like.

Although a thickness T131 of the insulating substrate layer 131 included in the insulating tape 130 is not particularly limited, it is preferable for the thickness T131 to be, for example, 5 μm or more to 80 μm or less, and more preferably to be 5 μm or more to 20 μm or less.

By setting the thickness of the insulating substrate layer 131 to 5 μm or more, the insulating tape layer, which is the layer containing polyethylene terephthalate that has high permittivity, can be made sufficiently thick, thereby reducing the core formed by the insulation layer 12. As a result, the size of the vehicle cable 10 can be restrained and the flexibility of the vehicle cable 10 can be increased.

Setting the thickness of the insulating substrate layer 131 to 80 μm or less can restrain the size of the vehicle cable 10 and increase the flexibility of the vehicle cable 10.

In a case where the insulating tape 130 includes the adhesive layer 132, a thickness T132 of the adhesive layer 132 is not particularly limited. However, it is preferable for the thickness T132 to be, for example, 0.1 μm or more to 10 μm or less, and more preferably to be 0.1 μm or more to 5 μm or less.

By setting thickness T132 of the adhesive layer 132 to 0.1 μm or more, a sufficient amount of adhesive can be contained, and the shape of the insulating tape layer 13 can be particularly stabilized. Since there is no difference in the stabilizing effect even if the adhesive layer 132 is made excessively thick, it is preferable for the thickness T132 to be 10 μm or less as described above in terms of cost.

The thickness T131 of the insulating substrate layer 131 and the thickness T132 of the adhesive layer 132 are not particularly limited, and each thickness can be selected from, for example, the above-described ranges. However, for example, thickness T131 of the insulating substrate layer 131 can be 12 μm, and the thickness T132 of the adhesive layer 132 can be 2 μm.

(1-2) General Shield Layer

The vehicle cable 10 according to the embodiment can include the general shield layer 15 that has a braided structure and is disposed on the outer periphery of the two-core cable 101.

The general shield layer 15 can be formed by disposing metal wires so as to form the braided structure as described above. The material of the metal wires included in the general shield layer 15 is not particularly limited, but a material such as copper, aluminum, a copper alloy, or the like can be used. The surfaces of the metal wires of the general shield layer 15 may be plated with nickel or tin. Hence, for example, a silver-plated copper alloy, a tin-plated cooper alloy, or the like can also be used as the metal wires of the general shield layer 15.

As described above, it is preferable for the general shield layer 15 to contact and be electrically coupled to the first metal foil of the above-described first shield layer 14. In such a case, the first shield layer 14 can be, for example, easily connected to an external terminal or the like via the general shield layer 15.

By providing the general shield layer 15 together with the above-described first shield layer 14, it is possible to reduce the introduction of noise from the outside of the cable and to reduce signal leakage to the outside of the cable. In addition, by electrically coupling the general shield layer 15 to the above-described first shield layer 14, the first shield layer 14 can be easily connected to an external terminal via the general shield layer 15.

Although a thickness T15 of the general shield layer 15 is not particularly limited, it is preferable for the thickness T15 to be 0.1 mm or more to 0.5 mm or less and more preferably be 0.1 mm or more to 0.3 mm or less.

By setting the thickness T15 of the general shield layer 15 to 0.1 mm or more, it is particularly possible to reduce the introduction of noise from the outside of the cable and to reduce signal leakage to the outside of the cable. Also, by setting the thickness T15 of the general shield layer 15 to 0.5 mm or less, the flexibility of the vehicle cable 10 can be increased.

The thickness T15 of the general shield layer 15 can be freely selected from, for example, the above-described ranges. However, as a representative value, the thickness T15 of the general shield layer 15 can be, for example, 0.2 mm.

The thickness T15 of the general shield layer 15 can be measured and calculated by, for example, the following procedure.

The thickness of the general shield layer 15 is measured by measuring, by a micrometer, a total of two locations in any cross section perpendicular to the longitudinal direction of the vehicle cable 10. The two locations to be measured by the micrometer are a location along the width direction of the vehicle cable 10 and a location along the height direction of the vehicle cable 10. Note that the width direction is the Y-axis direction in FIG. 1 and can also be called the long hand direction. The thickness direction is the X-axis direction in FIG. 1 and can also be called the short hand direction.

Subsequently, the average of the measure values obtained by measuring the two locations can be set as the thickness T15 of the general shield layer 15.

The thickness T15 of the general shield layer 15 can be a value obtained by measuring any cross section perpendicular to the longitudinal direction of the vehicle cable 10. However, as the thickness T15 of the general shield layer 15 may include a certain amount of variation, it is preferable for the thickness T15 to be the average of values measured on multiple cross sections perpendicular to the longitudinal direction of the vehicle cable 10. For example, it is preferable for the thickness T15 of the general shield layer 15 to be the average of the values obtained by measuring the thickness T15 on 3 or more to 10 or less cross sections, which are perpendicular to the longitudinal direction of the vehicle cable 10, in the above-described manner. Particularly, in the interest of efficiency, it is preferable for the length of each part to be the average of the values obtained by measuring the thickness T15 on three cross sections. When the length of each part is to be measured on multiple cross sections perpendicular to the longitudinal direction of the vehicle cable 10, the distance between two adjacent measurement surfaces in the longitudinal direction of the vehicle cable 10 is preferably 10 mm or more to 50 mm or less. For example, the distance between two adjacent measurement surfaces in the longitudinal direction of the vehicle cable 10 can be 20 mm.

A thickness T16 of the outer sheath 16 can also be measured in the same manner.

(1-3) Outer Sheath

The vehicle cable according to the embodiment includes the outer sheath 16 that is disposed on the outer periphery of the general shield layer 15. By providing the outer sheath 16, the two-core cable 101 and the general shield layer 15 that are disposed inside of the cable can be protected.

Although the material of the outer sheath 16 is not particularly limited, it can contain one or more types of resin selected from, for example, polyolefin resins such as polyethylene and polypropylene, and polyvinyl chloride and the like. The resin of the outer sheath 16 may be cross-linked or may not be cross-linked.

In addition to the above-described resins, the outer sheath 16 can contain additives such as flame retardants, flame retardant coagents, antioxidants, lubricants, colorants, reflective additives, concealers, processing stabilizers and plasticizers.

Although the formation method of the outer sheath 16 is not particularly limited, the outer sheath 16 can be formed by performing filled extrusion molding or drawdown extrusion molding by using, for example, the above-described materials contained in the outer sheath 16.

The thickness T16 of the outer sheath 16 is not particularly limited. However, for example, it is preferable for the thickness T16 to be 0.2 mm or more to 1.2 mm or less, more preferably be 0.3 mm or more to 1.0 mm or less, and even more preferably be 0.4 mm or more to 0.8 mm or less.

By setting the thickness T16 of the outer sheath 16 to 0.2 mm or more, the two-core cable 101 and the general shield layer 15 inside the cable can be sufficiently protected. Also, by setting the thickness T16 of the outer sheath 16 to 1.2 mm or less, the size of the vehicle cable 10 can be restrained, and the flexibility of the vehicle cable 10 can be increased.

Also, setting the thickness T16 of the outer sheath 16 to 0.3 mm or more to 1.0 mm or less, or more particularly to 0.4 mm or more to 0.8 mm or less can particularly improve the abrasion resistance, the flame retardancy, and the flexibility of the vehicle cable.

The thickness T16 of the outer sheath 16 can be freely selected from, for example, the above-described ranges. However, as a representative value, the thickness T16 of the outer sheath 16 can be, for example, 0.5 mm.

Since the thickness T16 of the outer sheath 16 can be measured in a similar manner to the thickness T15 of the general shield layer 15 describe above, a description thereof will be omitted.

(2) Second Embodiment

The vehicle cable according to the embodiment can also include a plurality of two-core cables in accordance with the device to be coupled.

Figure 2:
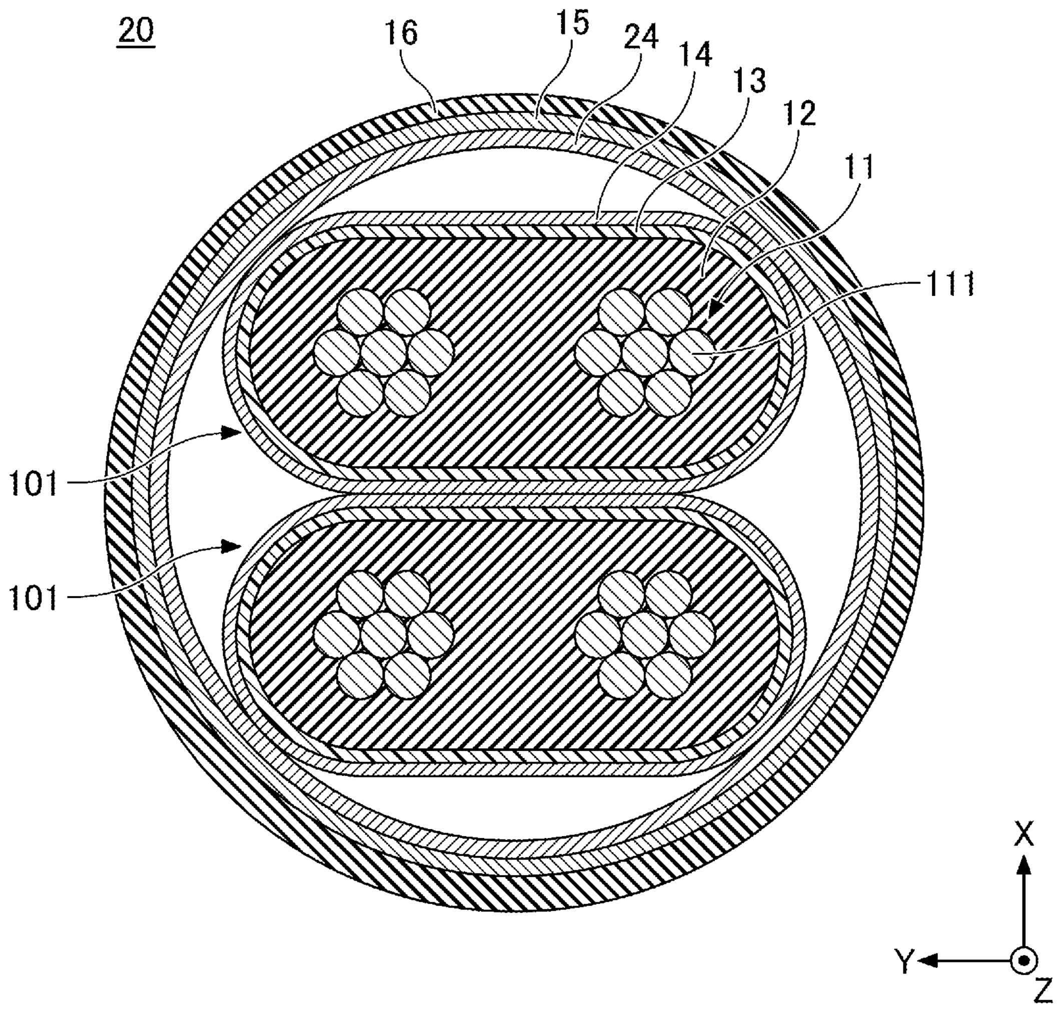
FIG. 2 is a cross-sectional view taken along a plane perpendicular to the longitudinal direction of a vehicle cable according to another embodiment of the present disclosure.

As illustrated in FIG. 2, a vehicle cable 20 according to the embodiment can include the plurality of two-core cables 101. In this case, the plurality of two-core cables 101 are twisted together, and a second shield layer 24 including a second metal foil on the outer periphery of the twisted plurality of two-core cables 101 can be arranged in the vehicle cable 20.

The general shield layer 15 and the outer sheath 16 described above can be disposed to cover the outer periphery of the second shield layer 24.

Including the plurality of two-core cables 101 in the vehicle cable 20 according to the embodiment in the above described manner can increase the types of devices that can be supported by the vehicle cable 20.

Note that a description of some of the matters already described in the first embodiment with respect to the two-core cable 101 and the like will be omitted. The components included in the vehicle cable 10 according to the embodiment will be described hereinafter.

(2-1) Two-Core Cables

The vehicle cable 20 illustrated in FIG. 2 includes two two-core cables 101. However, the vehicle cable according to the embodiment can also include three or more two-core cables.

The plurality of two-core cables 101 can be helically twisted with each other along the longitudinal direction. At this time, the twist rate is not particularly limited and can be selected in accordance with the size of the twisted units. However, for example, it is preferable for the twist rate to be 100 mm or more to 300 mm or less. Note that each two-core cable 101 includes, as described above, two conductor 11 that are two stranded wires arranged in parallel to each other, the insulation layer 12 configured to bundle and cover the two conductors 11, and the first shield layer 14 disposed on the outer periphery of the insulation layer 12. The insulating tape layer 13 can also be provided between the first shield layer 14 and the insulation layer 12.

Since the two-core cable 101 has already been described, a description thereof will be omitted here.

(2-2) Second Shield Layer

The second shield layer 24 can be disposed on the outer periphery of the twisted plurality of two-core cables 101, and can be disposed so as to be in contact with the respective outer peripheries (outer surfaces) of the two-core cables 101. Disposing the second shield layer on the outer periphery of the two-core cable allows an electrical coupling to be formed between the first shield layer 14 and the general shield layer 15.

The second shield layer 24 preferably includes a metal tape that can include the second metal foil and be helically wound along the longitudinal direction of, for example, the plurality of two-core cables 101. To form the second shield layer 24 so as to cover the entirety of the plurality of two-core cables 101, it is preferable to wind the metal tape around the outer periphery of the plurality of two-core cables 101 so that parts of the metal tape will overlap each other.

It is preferable for the metal tape included in the second shield layer 24 to be a double-sided metal tape that includes a metal foil on both surfaces of the substrate. That is, it is preferable for the metal tape included in the second shield layer 24 to include the upper metal foil 1422 on the upper surface of the substrate 1421 and the lower metal foil 1423 on the lower surface of the substrate 1421 as in the double-sided metal tape 142 illustrated in FIG. 4B. It is also preferable for the upper metal foil 1422, which is the metal foil disposed on the upper surface of the substrate 1421, to be in contact with the general shield layer 15. It is also preferable for the lower metal foil 1423, which is the metal foil disposed on the lower surface of the substrate 1421, to be in contact with the first metal foil of the first shield layer 14. In this case, the upper metal foil 1422 and the lower metal foil 1423 form the second metal foil included in the second shield layer 24.

By helically winding a double-sided metal tape, which includes the metal foil on the upper and lower surface of the substrate 1421, along the longitudinal direction of the plurality of two-core cables 101, the upper metal foil 1422 and the lower metal foil 1423 can come into contact at overlapping portions and be electrically coupled. The upper metal foil 1422 disposed on the upper surface of the substrate 1421 contacting the general shield layer 15 allows, for example, the first shield layer 14 of each two-core cable 101 to be electrically coupled to the general shield layer 15 via the second shield layer 24. By electrically coupling the first shield layer 14, the second shield layer 24, and the general shield layer 15 as described above, the first shield layer 14 and the second shield layer 24 can be easily connected to an external terminal via the general shield layer 15. Further, the first shield layer 14, the second shield layer 24, and the general shield layer 15 can be used to suppress signal leakage to the outside of the cable and to suppress the introduction of electromagnetic waves from the outside of the cable.

In the interest of the shielding effect, the material of the second metal foil included in the second shield layer 24 suffices to be a conductive material and is not particularly limited. However, it is preferable for the material of the second metal foil to be, for example, copper or aluminum. By using copper or aluminum as the second metal foil of the second shield layer 24, the metal foil can be ensured to have a uniform and sufficient conductivity. This can particularly suppress the leakage of signals to the outside of the cable and the introduction of electromagnetic waves from the outside of the cable.

As the preferable thicknesses of the respective portions of the double-sided tape illustrated in FIG. 4B have already been described, a description thereof will be omitted here.

The cable of configuration 1 is the example of the embodiment, and the cable of configuration 2 is the comparative example.

(1) Configuration of Cables (Cable of Configuration 1)

The vehicle cable 10 having the cross-sectional structure illustrated in FIG. 1 is famed according to CONFIGURATION 1 indicated in TABLE 1. More specifically, the vehicle cable 10 included two conductors 11. Each conductor 11 was formed by twisting 7 wires 111 that were tin-plated copper wires. The wire diameter D111 of each wire 111 was 0.16 mm. The diameter of each conductor 11 was 0.48 mm.

TABLE 1

| | CONFIGURATION 1 | | CONFIGURATION 2 | | CONFIGURATION 3 | |
|---|---|---|---|---|---|---|
| | REFERENCE SYMBOL | LENGTH (THICKNESS) | REFERENCE SYMBOL | LENGTH (THICKNESS) | REFERENCE SYMBOL | LENGTH (THICKNESS) |
| WIRE DIAMETER (CONDUCTOR DIAMETER) (mm) | D111 | 0.16 | D511 | 0.16 | D61 | 0.41 |
| DISTANCE BETWEEN CONDUCTORS (mm) | L11 | 1.48 | L51 | 1.23 | L61 | 1.40 |
| SIZE OF INSULATION LAYER (mm) | W121<br>H12 | 2.96<br>1.48 | D52 | 1.23 | W621<br>H62 | 2.80<br>1.40 |
| TWIST RATE (mm) | — | | 52A, 52B | 12 | — | |
| INSULATING TAPE LAYER (μm) | T131 | 12 | T131 | 12 | T131 | 12 |
| FIRST SHIELD LAYER (μm) | T141 | 15 | T141 | 15 | T141 | 15 |
| GENERAL SHIELD LAYER (mm) | T15 | 0.4 | T55 | 0.4 | — | — |
| OUTER SHEATH (mm) | T16 | 0.5 | T56 | 0.5 | — | — |

(2-3) General Shield Layer and Outer Sheath

The general shield layer 15 and the outer sheath 16 can be formed in the same manner as in the first embodiment. Hence, a description thereof will be omitted.

EXAMPLES

Although specific examples of the embodiment will be described hereinafter, the present invention is not limited to these examples.

Experiment Example 1

Figure 5:
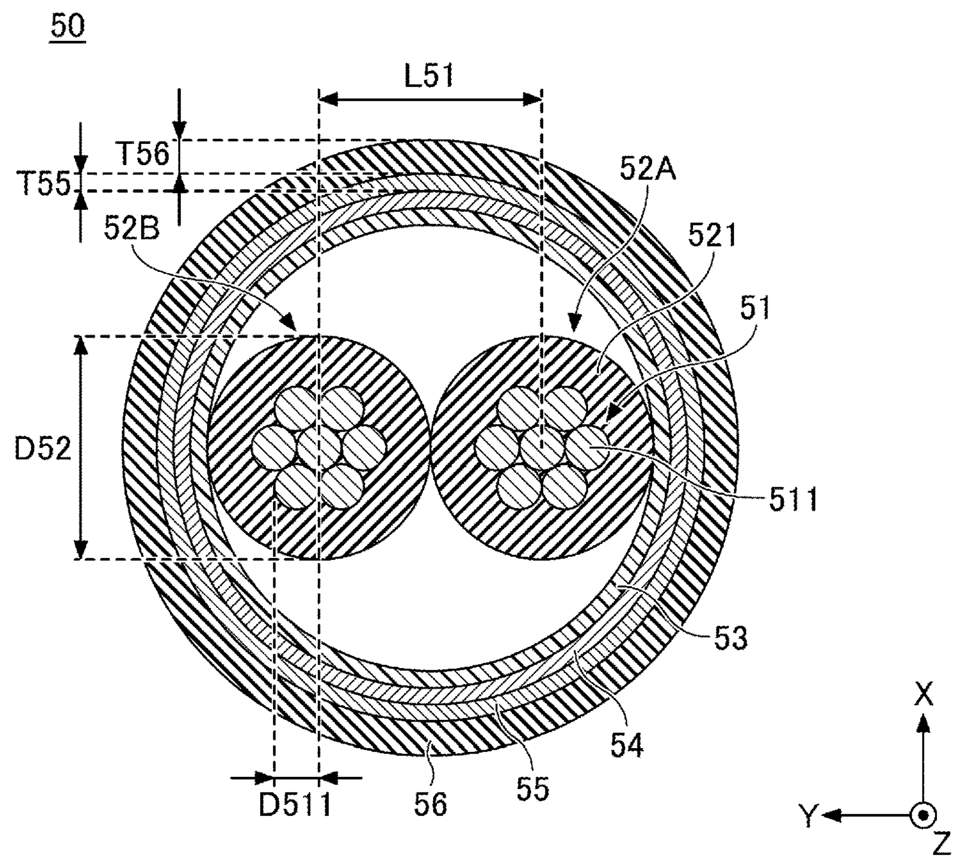
FIG. 5 is a cross-sectional view taken along a plane perpendicular to the longitudinal direction of a cable according to configuration 2 manufactured in EXPERIMENT EXAMPLES 1 and 3.

The vehicle cable 10 (to be also referred to as "the cable of configuration 1" hereinafter) that has the cross-sectional structure illustrated in FIG. 1 and a cable 50 (to be also referred to as "the cable of configuration 2" hereinafter) that has the cross-sectional structure illustrated in FIG. 5 were prepared, and the skew and the insertion loss of each cable were evaluated.

The measurement of the wire diameter was performed in accordance with the following procedure. First, in any cross section perpendicular to the longitudinal direction of the wire, the diameter of the wire was measured by a micrometer along the two orthogonal diameters of the wire. The average of the measured values obtained in the aforementioned two locations was obtained as the wire diameter. The conductor diameter was also measured and calculated in a similar manner.

The two conductors 11 are arranged in parallel to each other, and the insulation layer 12 bundles and covers the two conductors 11. Polypropylene was used for the material of the insulation layer 12, and no cross-linking was performed. The distance L11 between the conductors 11 and the width W121 and the height H12 of the insulation layer 12 were as indicated in TABLE 1. Note that the distance between the conductors 11 correspond to the distance between the respective centers of the circumscribed circles of the conductors 11.

The distance L11 between the conductors 11 and the width W121 and the height H12 of the insulation layer 12 were measured and calculated according to the following procedure. The procedure will be described by using the distance L11 between the conductors 11 as an example.

The distance L11 between the conductors 11 was measured on each of the acquired three cross sections perpendicular to the longitudinal direction of the vehicle cable. The average of the measured values thereof was set as the distance L11 between the conductors 11 of the vehicle cable. The three measured cross sections were set so that the distance between adjacent cross sections was 20 mm in the longitudinal direction of the cable. The width W121 and the height H12 of the insulation layer 12 were measured in the same manner.

The insulating tape layer 13, the first shield layer 14, the general shield layer 15, and the outer sheath 16 are disposed on the outer periphery of the insulation layer 12. The thickness of each layer is as indicated in TABLE 1.

The insulating tape layer 13 was formed using the insulating tape 130 illustrated in FIG. 3. Hence, the thickness T131 of the insulating substrate layer 131 is indicated as the thickness of the insulating tape layer in TABLE 1. The insulating substrate layer 131 was made of polyethylene terephthalate.

The first shield layer 14 was formed by using the metal tape 141 illustrated in FIG. 4A. Hence, the thickness T141 as the total of the thicknesses of the substrate 1411 and the metal foil 1412 in the metal tape 141 is indicated in TABLE 1. The substrate 1411 is made of polyethylene terephthalate, and the metal foil 1412 is made of aluminum foil.

When the insulating tape layer 13 and the first shield layer 14 were formed, the insulating tape 130 and the metal tape 141 were helically wound along the longitudinal direction of the insulation layer 12 so that the adhesive layer 132 of the insulating tape 130 and the adhesive layer 1413 of the metal tape 141 would adhere. That is, the insulating tape 130 was wound so that the surface 13A was positioned on the side of the insulation layer 12, and the metal tape 141 was wound so that the surface 141A was positioned on the side of the insulation layer 12.

Tin-plated copper wires were used as the wires forming the general shield layer 15. Polyethylene was used as the resin material of the outer sheath 16, and cross-linking was performed.

The thickness T15 of the general shield layer 15 and the thickness T16 of the outer sheath 16 were measured and calculated according to the following procedure. The procedure will be described using the case of the general shield layer 15 as an example.

First, in each of the acquired three cross sections perpendicular to the longitudinal direction of the vehicle cable 10, the thickness T15 was measured by a micrometer at a total of two locations, that is, one location along the width direction and the one location along the height direction of the vehicle cable 10. The average of the measured values of the two locations was set as the thickness T15 of the general shield layer 15 at each cross section.

Next, the average of all of the thicknesses T15 of the general shield layer 15 that were individually calculated for the three cross sections was obtained and set as the thickness T15 of the general shield layer 15 of the vehicle cable. The three measured cross sections were set so that the distance between adjacent cross sections was 20 mm in the longitudinal direction of the cable.

The thickness T16 of the outer sheath 16 was also measured and calculated in a similar manner to the thickness T15 of the general shield layer 15.

(Cable of Configuration 2)

The cable 50 that has the cross-sectional structure illustrated in FIG. 5 has the configuration of CONFIGURATION 2 indicated in TABLE 1. More specifically, the cable 50 included two conductors 51. Each conductor 51 was formed by twisting 7 wires 511 that were tin-plated copper wires. A wire diameter D511 of each wire 511 were 0.16 mm. The outer diameter of each conductor 51 was 0.48 mm.

The wire diameter of each wire and the outer diameter of each conductor were measured and evaluated in a similar manner to the cable of configuration 1.

The conductors 51 were formed as coated wires 52A and 52B, each of which with an insulation layer 521 disposed on the outer periphery. The two coated wires 52A and 52B were twisted at a twist rate of 12 mm. Cross-linked polyethylene was used for the insulation layer of each of the coated wires 52A and 52B.

The outer diameter D52 of each coated wire was 1.23 mm, and a distance L51 between the conductors 51 was 1.23 mm. Note that the distance L51 between the conductors 51 correspond to the distance between the respective centers of the circumscribed circles of the conductors 51.

The outer diameter D52 of each coated wire was evaluated in the same manner as the wire diameter. The distance L51 between the conductors 51 was evaluated in the same manner as the cable of configuration 1.

A insulating tape layer 53, a first shield layer 54, a general shield layer 55, and an outer sheath 56 are disposed on the outer periphery of the two coated wires 52A and 52B. The respective thicknesses of the layers are as indicated in TABLE 1.

The insulating tape layer 53 to the outer sheath 56 were famed in the same manner as the vehicle cable 10 of configuration 1 described above.

Since the length of each of the insulating tape layer 53 to the outer sheath 56 was measured and calculated in the same manner as the cable of configuration 1, a description thereof will be omitted.

(2) Evaluation (Skew)

A digital serial analyzer was used to send electric pulses to the two conductors of the cable of the configuration 1 described above and to the two conductors of the cable of configuration 2, and the skew was obtained by measuring the delay time per meter. 20 cables of the same configuration were measured for each of the cable of configuration 1 and the cable of configuration 2.

In the case of the vehicle cable 10 of configuration 1, it was confirmed that skew was distributed in the range of 0 psec/m or more to 4 psec/m or less.

In contrast, in the case of the cable 50 of configuration 2, it was confirmed that skew was distributed in the range of 0 psec/m or more to 15 psec/m or less.

That is, it was confirmed that the delay time was suppressed more in the vehicle cable 10 of configuration 1 than in the cable 50 of configuration 2.

(Insertion Loss)

Figure 7:
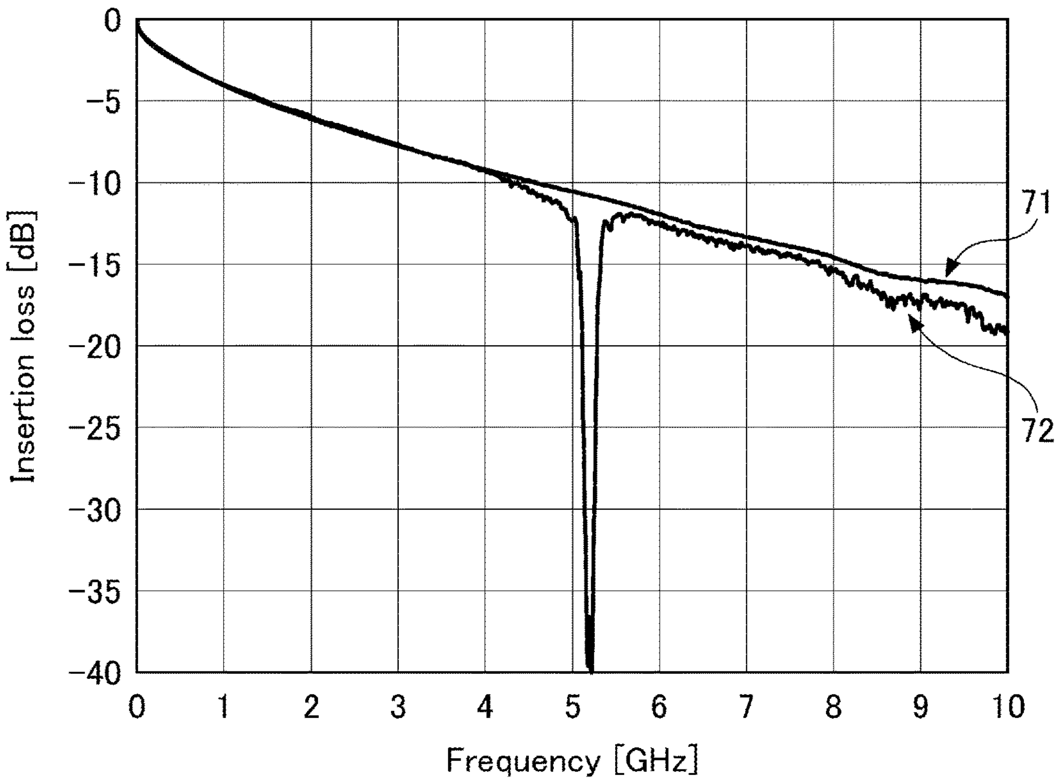
FIG. 7 is a graph illustrating the frequency characteristics of insertion loss evaluated in EXPERIMENT EXAMPLE 1.

Differential signals were input to each of the cable of configuration 1 and the cable of configuration 2 to evaluate the frequency characteristics of insertion loss. The evaluation was carried out in air at room temperature. The results are indicated in FIG. 7. In FIG. 7, line 71 indicates the evaluation result of the cable of configuration 1, and line 72 indicates the evaluation result of the cable of configuration 2.

As is obvious from FIG. 7, it was confirmed that the cable of configuration 1 according to the example is able to transmit signals of 4 GHz or higher, particularly, signals of 5 GHz or higher. Note that although it is indicated in FIG. 7 that signals can be transmitted without a large insertion loss in frequency bands of 10 GHz or less, it was confirmed that signals are also able to be transmitted without a large insertion loss in higher frequency bands, for example, in frequency bands higher than 10 GHz.

In contrast, with respect to the cable of configuration 2 according to the comparative example, a large insertion loss was confirmed when the frequency band exceeded 4 GHz, and it was confirmed that the cable of configuration 2 is not applicable for transmitting signals of 4 GHz or higher.

Experiment Example 2

The abrasion resistance, the flame retardancy, and the flexibility of the vehicle cable 10, which has the cross-sectional shape indicated in FIG. 1, were evaluated. EXPERIMENT EXAMPLES 2-1 to 2-6 all are examples of the embodiment.

In each experiment example, the vehicle cable 10 were manufactured in the same manner as configuration 1 of EXPERIMENT EXAMPLE 1 except that the thickness of the outer sheath 16 was adjusted to be the value indicated in TABLE 2.

The abrasion resistance was evaluated by performing a tape test in compliance with JASO D618. The coated wire of each sample was cut to a length of 1000 mm, and #150G abrasion tape was pressed on to the coated wire with a pressing load of 1.9 kg. Subsequently, the tape was sent out at a tape moving speed of 1500 mm/min, and the amount of the tape that was sent out was measured until the conductors were exposed.

Flame retardancy was evaluated by performing a horizontal burning test in compliance with JASO-D618. In the horizontal burning test, the underside of the center of the electric wire, held horizontally, was brought into contact with the flame of a tirrill burner at an angle of 20° for 30 seconds, and the time until the flame was extinguished was measured.

Figure 8:
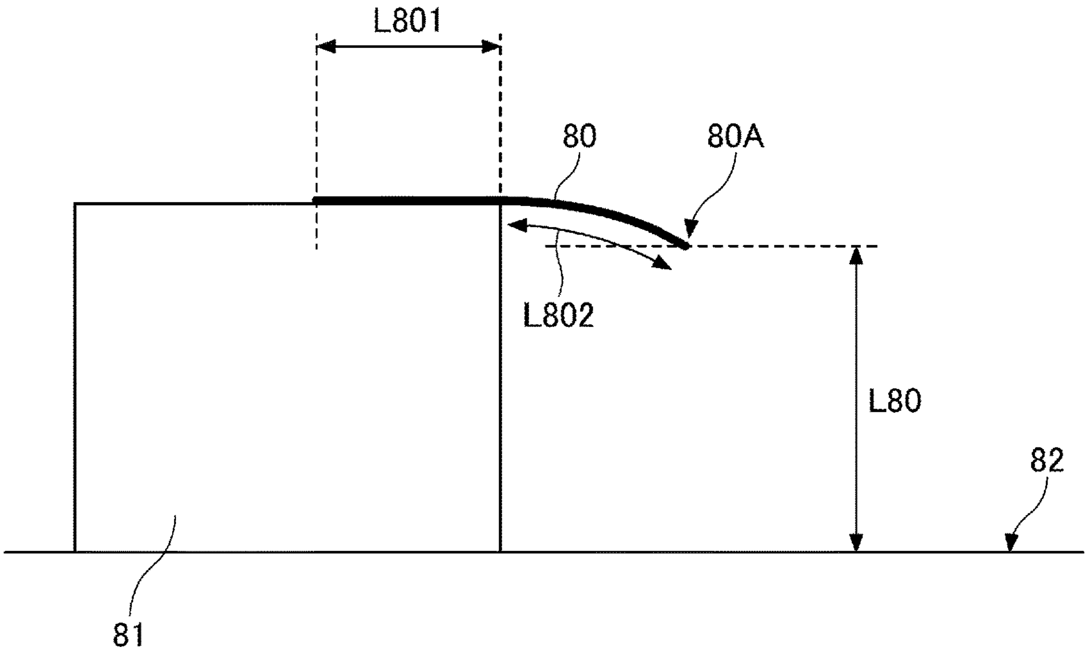
FIG. 8 is a view explaining a flexibility test.

Flexibility was evaluated by placing an evaluation cable 80 with a length of 50 cm on a table 81 as illustrated in FIG. 8, thus setting a state where the cable 80 protrudes 25 cm from the table 81. That is, a length L801 and a length L802 in FIG. 8 each were 25 cm.

In this case, an evaluation was performed by measuring a distance L80 between a ground 82 and an end 80A of the cable 80. The bend of the vehicle cable increases as shorter the distance L80 is, thus indicating better flexibility.

With respect to abrasion resistance, a case that was 250 cm or more was evaluated as A, a case that was 200 cm or more but less than 250 cm was evaluated as B, and a case that was 200 cm or less was evaluated as C. An evaluation of A represents a case with the best abrasion resistance, that is, a case that can withstand abrasion. The abrasion resistance decreases in the order of evaluations B and C.

With respect to flame retardancy, a case that was 30 seconds or less was evaluated as A, a case that was 30 seconds or longer to 40 seconds or less was evaluated as B, and a case that was longer than 40 seconds was evaluated as C. An evaluation of A represents a case with the best flame retardancy, that is, a case that can withstand burning. The flame retardancy decreases in the order of evaluations B and C.

With respect to flexibility, a case that was 130 mm or less was evaluated as A, a case that was 130 mm or longer to 135 mm or less was evaluated as B, and a case that was longer than 135 mm was evaluated as C. An evaluation of A represents a case with the best flexibility, that is, a case that can be bent easily. The flexibility decreases in the order of evaluations B and C.

As the overall evaluation, for the three types of evaluations described above, an evaluation of C was given when at least one C was contained, an evaluation of B was given when no C was contained but at least one B was contained, and an evaluation of A was given when all the three types of evaluations were A.

TABLE 2 indicates the thickness of the outer sheath of the vehicle cable subjected to the evaluation and the evaluation results.

TABLE 2

| | THICKNESS OF OUTER SHEATH (mm) | ABRASION RESISTANCE | | FLAME RETARDANCY | | FLEXIBILITY | | OVERALL EVALUATION |
|---|---|---|---|---|---|---|---|---|
| | | MEASURED VALUE (cm) | EVALUATION | MEASURED VALUE (sec) | EVALUATION | MEASURED VALUE (mm) | EVALUATION | |
| EXPERIMENT EXAMPLE 2-1 | 1.2 | 882 | A | 10 | A | 140 | C | C |
| EXPERIMENT EXAMPLE 2-2 | 1.0 | 735 | A | 14 | A | 133 | B | B |
| EXPERIMENT EXAMPLE 2-3 | 0.8 | 588 | A | 20 | A | 127 | A | A |
| EXPERIMENT EXAMPLE 2-4 | 0.4 | 294 | A | 26 | A | 121 | A | A |
| EXPERIMENT EXAMPLE 2-5 | 0.3 | 220 | B | 36 | B | 115 | A | B |
| EXPERIMENT EXAMPLE 2-6 | 0.2 | 147 | C | 57 | C | 109 | A | C |

According to the results indicated in TABLE 2, the overall evaluation result was A or B in cases where the thickness T16 of outer sheath 16 was 0.3 mm or more to 1.0 mm or less, confirming excellence in abrasive resistance, flame retardancy, and flexibility. Furthermore, the overall evaluation result was A in cases where the thickness T16 of outer sheath 16 was 0.4 mm or more to 0.8 mm or less, confirming particular excellence in abrasive resistance, flame retardancy, and flexibility.

Experiment Example 3

In addition to evaluations performed on the cable of configuration 1 and the cable of configuration 2 in EXPERIMENT EXAMPLE 1, a cable of configuration 3 was prepared and evaluated for bendability.

EXPERIMENT EXAMPLE 3-1 indicates the evaluation result of the vehicle cable of configuration 1 and is an example of the embodiment.

EXPERIMENT EXAMPLE 3-2 indicates the evaluation result of the vehicle cable of configuration 2 and is a comparative example.

EXPERIMENT EXAMPLE 3-3 indicates the evaluation result of the vehicle cable of configuration 3 and is a comparative example.

Figure 6:
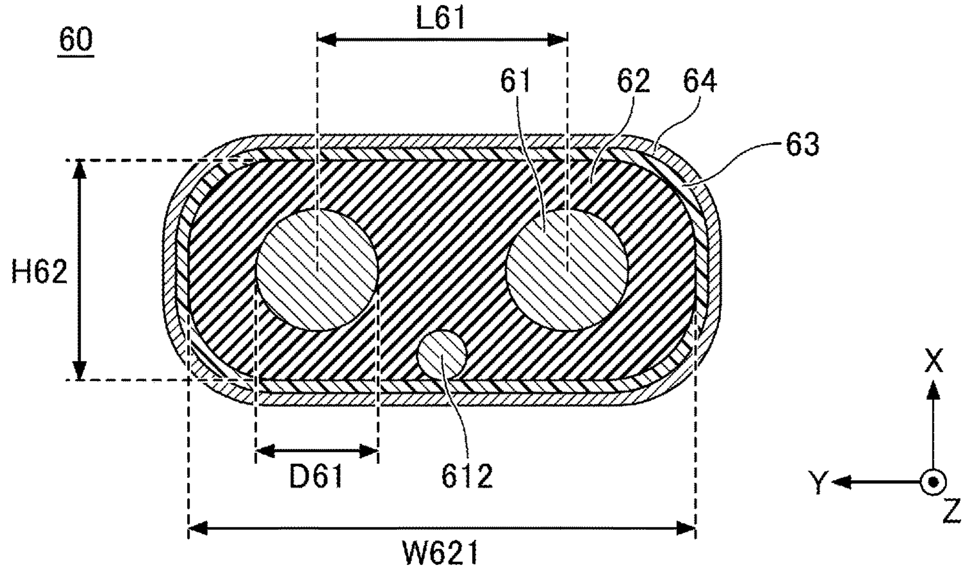
FIG. 6 is a cross-sectional view taken along a plane perpendicular to the longitudinal direction of a cable according to configuration 3 manufactured in EXPERIMENT EXAMPLE 3.

(1) Cable of Configuration 3 The cable of configuration 3 has a cross-sectional structure illustrated in FIG. 6, and includes two conductors 61 that are solid wires instead of stranded wires. The conductor diameter D61 of the conductor 61 was 0.41 mm as indicated in TABLE 1, and a distance L61 between the conductors was 1.4 mm. A tin-plated copper wire was used as each conductor 61.

The two conductors 61 are bundled and covered by an insulation layer 62. Polypropylene was used for the material of the insulation layer 62, and no cross-linking was performed. A width W621 of the insulation layer 62 was 2.80 mm, and a height H62 of the insulation layer 62 was 1.40 mm.

A drain wire 612 was also disposed in the insulation layer 62.

An insulating tape layer 63 and a first shield layer 64 were disposed on the outer periphery of the insulation layer 62. The insulating tape layer 63 and the first shield layer 64 were formed in the same manner as the cable of configuration 1 in EXPERIMENT EXAMPLE 1.

Since the insulating tape layer 63 was formed by using the insulating tape 130 illustrated in FIG. 3, the thickness T131 of the insulating substrate layer 131 is indicated as the thickness of the insulating tape layer 63 in TABLE 1. Also, since the first shield layer 64 was formed by using the metal tape 141 illustrated in FIG. 4A, the thickness T141, which is the total of the thicknesses of the substrate 1411 and the metal foil 1412 in the metal tape 141, is indicated in TABLE 1 as the thickness of the first shield layer 64.

The general shield layer and the outer sheath were not provided.

As the cable of configuration 1 and the cable of configuration 2 have the same configurations as those in the case of EXPERIMENT EXAMPLE 1, a description thereof will be omitted here.

(2) Evaluation

Figure 9:
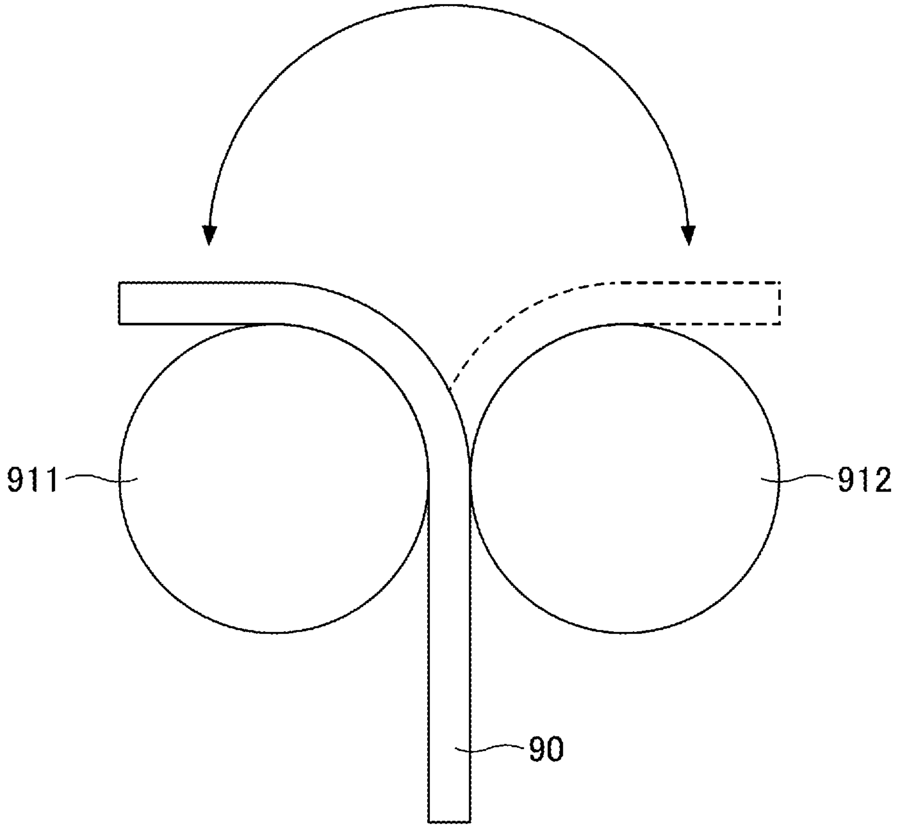
FIG. 9 is a view explaining a bending test.

The bendability evaluation was performed by placing, as illustrated in FIG. 9, a cable 90 to be evaluated between two mandrels 911 and 912, which were arranged horizontally and parallel to each other and had a diameter of 4 mm, and applying a load of 200 g vertically downward on the cable 90. In this state, an operation in which the upper end of the cable 90 is bent 90° in the horizontal direction to be abutted against the upper side of one mandrel 911, and is subsequently bent 90° in the horizontal direction to be abutted against the upper side of the other mandrel 912 was repeatedly performed.

The repeated operation described above was performed by measuring the resistance values of all of the conductors in the cable 90. The number of bending operations performed until the resistance increased to 10 times or more of the initial resistance value was counted with respect to one of the conductors. Note that one bending operation comprises an operation in which the cable is first bent to the left side, then bent to the right side, and subsequently returned to the left side. The superiority of the bendability increases as the number of bending operations, as a result of the bending test, increases.

Three cables were prepared for the same configuration, and three evaluations were performed. The average value of the three evaluation is also indicated.

Each evaluation result is indicated by a converted value obtained by converting the number of bending operations of the first test of EXPERIMENT EXAMPLE 3-2 as 100. The superiority of the bendability increases as this numerical value increases. For example, the number of bending operations of the first test of EXPERIMENT EXAMPLE 3-1 is 2.7 times higher than the number of bending operations of the first test of EXPERIMENT EXAMPLE 3-2. The evaluation results are indicated in TABLE 3.

TABLE 3

| | EXPERIMENT EXAMPLE 3-1 | EXPERIMENT EXAMPLE 3-2 | EXPERIMENT EXAMPLE 3-3 |
|---|---|---|---|
| FIRST EVALUATION | 270 | 100 | 25 |
| SECOND EVALUATION | 330 | 130 | 30 |
| THIRD EVALUATION | 290 | 110 | 45 |
| AVERAGE | 297 | 113 | 33 |

According to the results indicated in TABLE 3, it was confirmed that the cable of EXPERIMENT EXAMPLE 3-1 which is the example of the embodiment has superior bendability.

In contrast, it was confirmed that the cable of EXPERIMENT EXAMPLE 3-3 has a particularly inferior bendability because the conductor was not a stranded wire.

What is claimed is:

1. A vehicle cable capable of transmitting a signal of 4 GHz or higher, the vehicle cable comprising:

a plurality of two-core cables, a general shield layer that has a braided structure and is disposed on an outer periphery of the plurality of two-core cables; and an outer sheath disposed on an outer periphery of the general shield layer, wherein each of the plurality of two-core cable includes two conductors that are a pair of stranded wires arranged in parallel to each other, an insulation layer configured to bundle and cover the two conductors, and a first shield layer including a first metal foil that is disposed on an outer periphery of the insulation layer, wherein the plurality of two-core cables are twisted and a second shield layer including a second metal foil is disposed on an outer periphery of the twisted plurality of two-core cables, wherein the general shield layer and the outer sheath are disposed so as to cover an outer periphery of the second shield layer, and wherein the second shield layer includes a double-sided metal tape that is wound helically along a longitudinal direction of the plurality of two-core cables, and includes the second metal foil on an upper surface and a lower surface of a substrate, the second metal foil disposed on the upper surface of the substrate being electrically connected with the general shield layer, and the second metal foil disposed on the lower surface of the substrate being electrically connected with the first metal foil, wherein each of the plurality of two-core cables include an insulating tape layer between the insulation layer and the first shield layer, and wherein the insulating tape layer includes an insulating tape that is wound helically along a longitudinal direction of the insulation layer and includes an insulating substrate layer containing polyethylene terephthalate.

2. The vehicle cable as claimed in claim 1, wherein the second metal foil is made of copper or aluminum.

3. The vehicle cable as claimed in claim 1, wherein the insulation layer contains one or more types of insulating resins selected from polypropylene and cross-linked polyethylene.

4. The vehicle cable as claimed in claim 1, wherein the first metal foil is made of copper or aluminum.

5. The vehicle cable as claimed in claim 1, wherein a thickness of the outer sheath is 0.3 mm or more to 1.0 mm or less.

6. The vehicle cable as claimed in claim 1, wherein a thickness of the outer sheath is 0.4 mm or more to 0.8 mm or less.

7. The vehicle cable as claimed in claim 1, wherein the first shield layer is thicker than the insulating tape layer.

8. The vehicle cable as claimed in claim 7, wherein the general shield layer is thicker than the first shield layer.

9. The vehicle cable as claimed in claim 1, wherein the general shield layer contains tin-plated copper wires as elementary wires.

10. The vehicle cable as claimed in claim 1, wherein the first shield layer is a metal tape that includes a substrate and the first metal foil, the metal tape being wound around an outer periphery of the insulation layer such that a portion overlaps with each other.

11. The vehicle cable as claimed in claim 10, wherein one side of the substrate of the first shield layer has the first metal foil, and the other side has a third metal foil.

12. The vehicle cable as claimed in claim 1, wherein the insulation layer has a flat portion along a width direction on a cross-section perpendicular to a longitudinal direction of the vehicle cable.

13. The vehicle cable as claimed in claim 12, wherein a height of the insulation layer corresponding to a length of a short axis is equal to a width of the flat portion of the insulation layer.

14. The vehicle cable as claimed in claim 12, wherein an interval between the two conductors arranged in parallel is equal to a width of the flat portion of the insulation layer.

* * * * *